(12) United States Patent
Cunningham

(10) Patent No.: US 7,431,267 B1
(45) Date of Patent: Oct. 7, 2008

(54) APPARATUS FOR PULLING CABLE

(76) Inventor: Dennis Cunningham, 2530 N. Highway 11 SE, Elizabeth, IN (US) 47117

( * ) Notice: Subject to any disclaimer, the term of this patent is extended or adjusted under 35 U.S.C. 154(b) by 0 days.

(21) Appl. No.: 11/537,734

(22) Filed: Oct. 2, 2006

Related U.S. Application Data (60) Provisional application No. 60/723,260, filed on Oct. 3, 2005.

(51) Int. Cl.
*H02G 1/08* (2006.01)
(52) U.S. Cl. .................. 254/134.3 FT; 254/134.3 R
(58) Field of Classification Search ........ 254/134.3 FT, 254/134.5, 134.3 R
See application file for complete search history.

(56) References Cited

U.S. PATENT DOCUMENTS

| | | | |
|---|---|---|---|
| 3,322,398 A | 5/1967 | Smith | |
| 3,429,374 A | 2/1969 | Pridy | |
| 3,467,359 A | 9/1969 | Durand | |
| 3,876,183 A | 4/1975 | Strout et al. | |
| 4,454,999 A * | 6/1984 | Woodruff | 242/388.7 |
| 4,456,225 A * | 6/1984 | Lucas | 254/134.3 FT |
| 4,664,331 A | 5/1987 | Halbrook | |
| 4,767,073 A | 8/1988 | Malzacher | |
| 4,830,300 A | 5/1989 | Taylor et al. | |
| 4,836,503 A * | 6/1989 | Giroux | 254/134.3 FT |
| 5,123,630 A | 6/1992 | Watson et al. | |
| 5,363,648 A * | 11/1994 | Akazaki et al. | 60/276 |
| 5,464,193 A * | 11/1995 | Wrate | 254/134.3 FT |
| 5,474,278 A | 12/1995 | Cleveland | |
| 5,692,735 A | 12/1997 | Aho et al. | |
| 5,842,684 A | 12/1998 | Aho | |
| 5,921,529 A | 7/1999 | Wilson, Sr. et al. | |
| 6,152,425 A | 11/2000 | Boyer | |
| 6,193,218 B1 * | 2/2001 | Philyaw | 254/326 |
| 6,494,437 B1 | 12/2002 | Boyer | |
| 2004/0146389 A1 | 7/2004 | Bares et al. | |

OTHER PUBLICATIONS

Nesco Sales & Rentals, 2005 Summer/Fall Catalog, 2005, pp. 26-28.

\* cited by examiner

*Primary Examiner*—Lee D Wilson
(74) *Attorney, Agent, or Firm*—Stites & Harbison, PLLC; David W. Nagle, Jr.; Robert C. Yang (57) ABSTRACT

An apparatus for pulling cable includes: a frame for attaching the apparatus to a skid steer loader or similar easily maneuverable construction vehicle; a drum mounted for rotation with respect to the frame; and a hydraulic motor for rotating the drum. The hydraulic motor uses the hydraulic system of the skid steer loader or similar easily maneuverable construction vehicle to rotate the drum and draw a pull line through the conduit and onto the drum, causing a cable attached to the pull line to be pulled through the conduit.

21 Claims, 6 Drawing Sheets

APPARATUS FOR PULLING CABLE

CROSS-REFERENCE TO RELATED APPLICATIONS

The present application claims priority to U.S. Provisional Patent Application Ser. No. 60/723,260 filed on Oct. 3, 2005, the entire disclosure of which is incorporated herein by reference.

BACKGROUND OF THE INVENTION

Electric power cables, fiber optic cables, phone lines and other types of cables or wires are commonly enclosed in underground conduits, particularly in newer residential developments. When installing such underground cables, a string is often threaded into and positioned in a conduit before it is installed underground. Once the conduit has been buried, the ends of the string remain accessible. An end of the string is then connected to a pull line (e.g., a rope), so that by pulling the string through the other end of the conduit, the pull line is threaded into the conduit. Then, one end of the pull line is connected to a reel or spool of cable. The other end of the pull line is then pulled, often manually, to draw the cable through the conduit. Of course, such pulling of the cable through the conduit can be a laborious and time-consuming task, especially if particularly long lengths of cable are to be drawn through a conduit.

Although some forms of winches or other machines have been developed to assist in pulling cable through a conduit, such machines tend to be cumbersome and not easily re-positioned. Specifically, the size and complexity of such machines does not allow them to be readily moved from one location to another within a subdivision or similar area to rapidly complete multiple cable pulls.

Thus, there remains a need for an apparatus that can easily be maneuvered and re-positioned to efficiently complete multiple cable pulls within a subdivision or similar area.

SUMMARY OF THE INVENTION

The present invention is an apparatus for pulling cable that can be readily secured to a skid steer loader or similar easily maneuverable construction vehicle. An exemplary apparatus made in accordance with the present invention includes a frame with holes for receiving the lower spring-loaded locking pins mounted on the front plate of a skid steer loader or other similar easily maneuverable construction vehicle. The frame includes an upper lip for engaging the upper, substantially horizontal edge of the front plate of the skid steer loader. Finally, the apparatus includes a drum and a hydraulic motor for rotating the drum to assist in pulling cable, with fluid to the hydraulic motor being supplied by the existing hydraulic system of the skid steer loader.

To mechanically secure the apparatus of the present invention to a skid steer loader, the skid steer loader is driven forward towards the frame of the apparatus. When the horizontal edge of the plate is positioned below the lip of the frame of the apparatus, the boom of the skid steer loader is raised through use of the skid steer loader's hydraulic system, causing the horizontal edge of the plate to engage the lip of the apparatus. The levers of the skid steer loader can then be manipulated to cause the locking pins to drop through and engage the holes defined by the apparatus. The apparatus is thus mechanically secured to the skid steer loader and can then be moved by manipulating the boom of the skid steer loader or by moving the skid steer loader.

To facilitate the pulling of cable, the frame of the apparatus supports the drum, which is mounted for rotation with respect to the frame. A length of pull line is coiled onto the drum. The pull line is uncoiled from the drum and is threaded through a conduit. Once the pull line is completely threaded through the conduit, the pull line is then connected to the reel or spool of cable. Once the pull line is connected to the reel or spool of cable, the drum is rotated in a reverse direction. The pull line is then coiled onto the drum, and the cable is pulled through the conduit. Once the cable is sufficiently pulled past the opening of the conduit, the pull line is disconnected from the cable, and the apparatus is then ready to pull more cable.

DETAILED DESCRIPTION OF THE INVENTION

The present invention is an apparatus for pulling cable that can be readily secured to a skid steer loader or similar easily maneuverable construction vehicle.

A skid steer loader is a compact, easily maneuverable vehicle used for various construction-related tasks. A typical skid steer loader includes wheels or permanently mounted tracks, and is considered a "loader" in that it commonly includes a front bucket that can be raised, lowered, or pivoted to lift and move dirt or other construction materials. However, such a bucket can often be removed and replaced with a number of different attachments to accomplish various tasks. For example, various forms of tillers, sweepers, blades, graders, and augers are available as attachments for common skid steer loaders.

Figure 3:
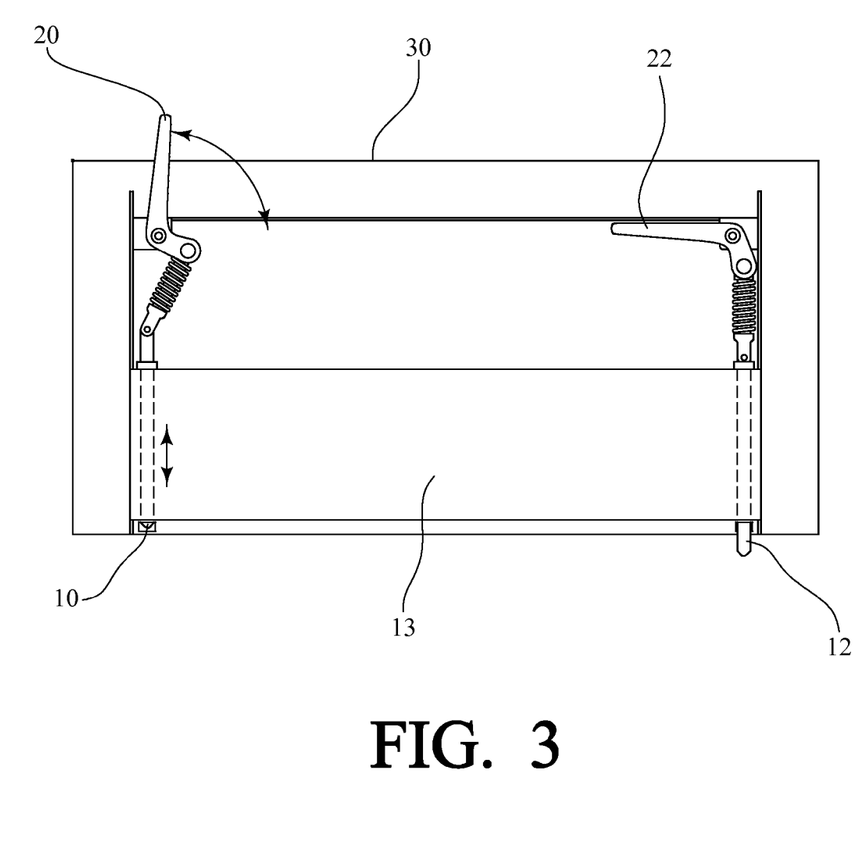
FIG. 3 is a rear view of the front plate of a typical skid steer loader.

To facilitate such versatility, a typical skid steer loader is provided with standard hardware for securing various attachments to the skid steer loader. In most cases, and as illustrated in FIG. 3, skid steer loader manufacturers have adopted some form of the Quick-Tach™ system developed by the Bobcat Company of West Fargo, N. Dak. Specifically, the front portion of the skid steer loader includes a plate 13. Secured to this plate 13 are two lower spring-loaded locking pins 10, 12 that are designed to engage corresponding holes in an attachment when levers 20, 22, which are mounted on the rear surface of the plate 13, are manipulated. Furthermore, it should be recognized that the plate 13 has an upper, substantially horizontal edge 30, the importance of which is further described below.

In any event, the attachment of the present invention is an apparatus for pulling cable. As illustrated in FIGS. 2 and 4A-4C, an exemplary apparatus 40 made in accordance with the present invention includes a frame 41 with the aforementioned holes 44a, 44b for receiving the lower spring-loaded locking pins 10, 12 mounted on the plate 13 of the skid steer loader. The frame 41 also includes an upper lip 46 for engaging the upper, substantially horizontal edge 30 of the plate 13, as described above with reference to FIG. 3. Finally, the exemplary apparatus 40 includes a drum 50 and a hydraulic motor 54 for rotating the drum 50 to assist in pulling cable, as is further described below.

Figure 4A:
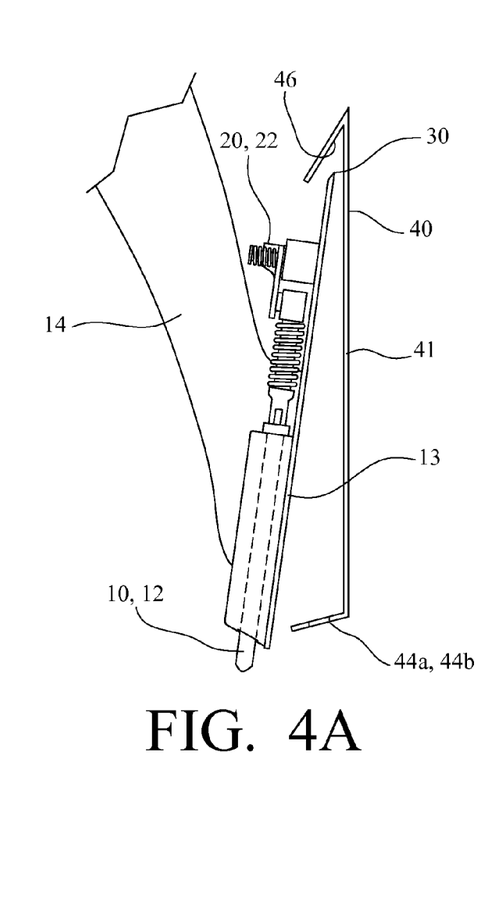
FIGS. 4A, 4B, and 4C are a series of side views illustrating how the exemplary apparatus of FIG. 1 (or FIG. 1A) is secured to a typical skid steer loader.
Figure 4B:
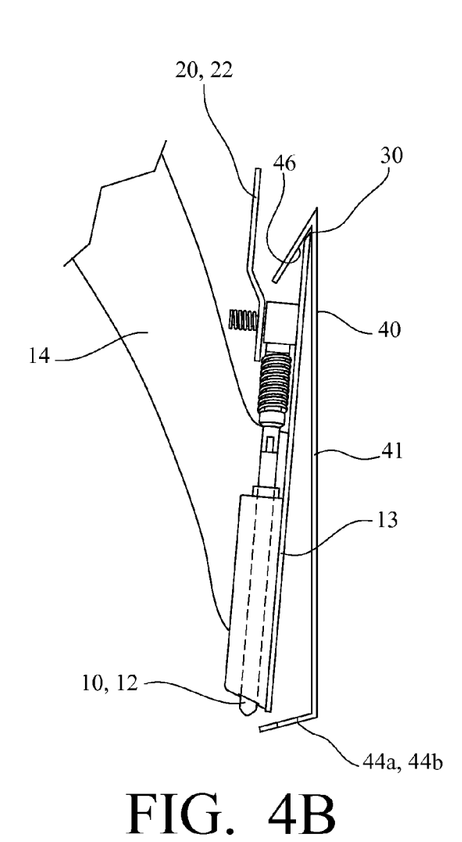
Figure 4C:
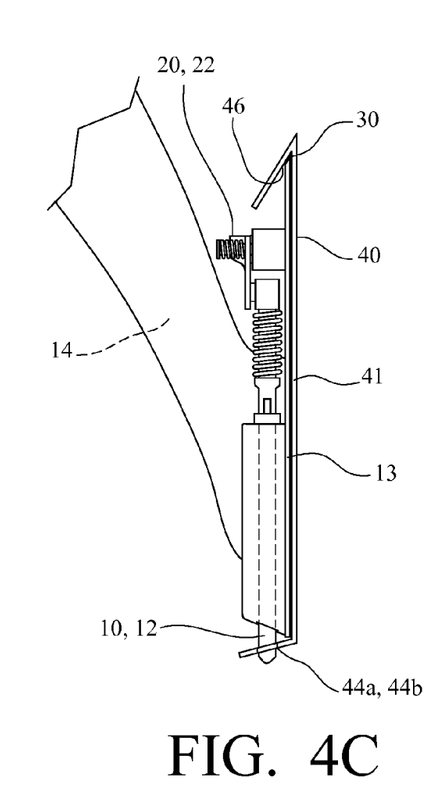

To mechanically secure the apparatus 40 of the present invention to a skid steer loader, the skid steer loader is driven forward towards the frame 41 of the apparatus 40, as illustrated in FIG. 4A. When the horizontal edge 30 of the plate 13 is positioned below the lip 46 of the frame 41 of the apparatus 40, the boom 14 of the skid steer loader is raised through use of the hydraulic system of the skid steer loader, causing the horizontal edge 30 of the plate 13 to engage the lip 46 of the apparatus 40. Then, the levers 20, 22 of the skid steer loader are manipulated (i.e., raised) to retract the lower spring-loaded locking pins 10, 12 mounted on the plate 13 of the skid steer loader, as illustrated in FIG. 4B. The skid steer loader moves forward so that the plate 13 is positioned against with the frame 41 of the apparatus 40. Then, the levers 20, 22 of the skid steer loader can then be manipulated (i.e., lowered) to cause the lower spring-loaded locking pins 10, 12 to drop through and engage the holes 44a, 44b defined by the apparatus 40, as illustrated in FIG. 4C. The apparatus 40 is thus mechanically secured to the skid steer loader. The apparatus 40 can then be moved (i.e., raised or lowered) by manipulating the boom 14 of the skid steer loader or by moving the skid steer loader.

Figure 1:
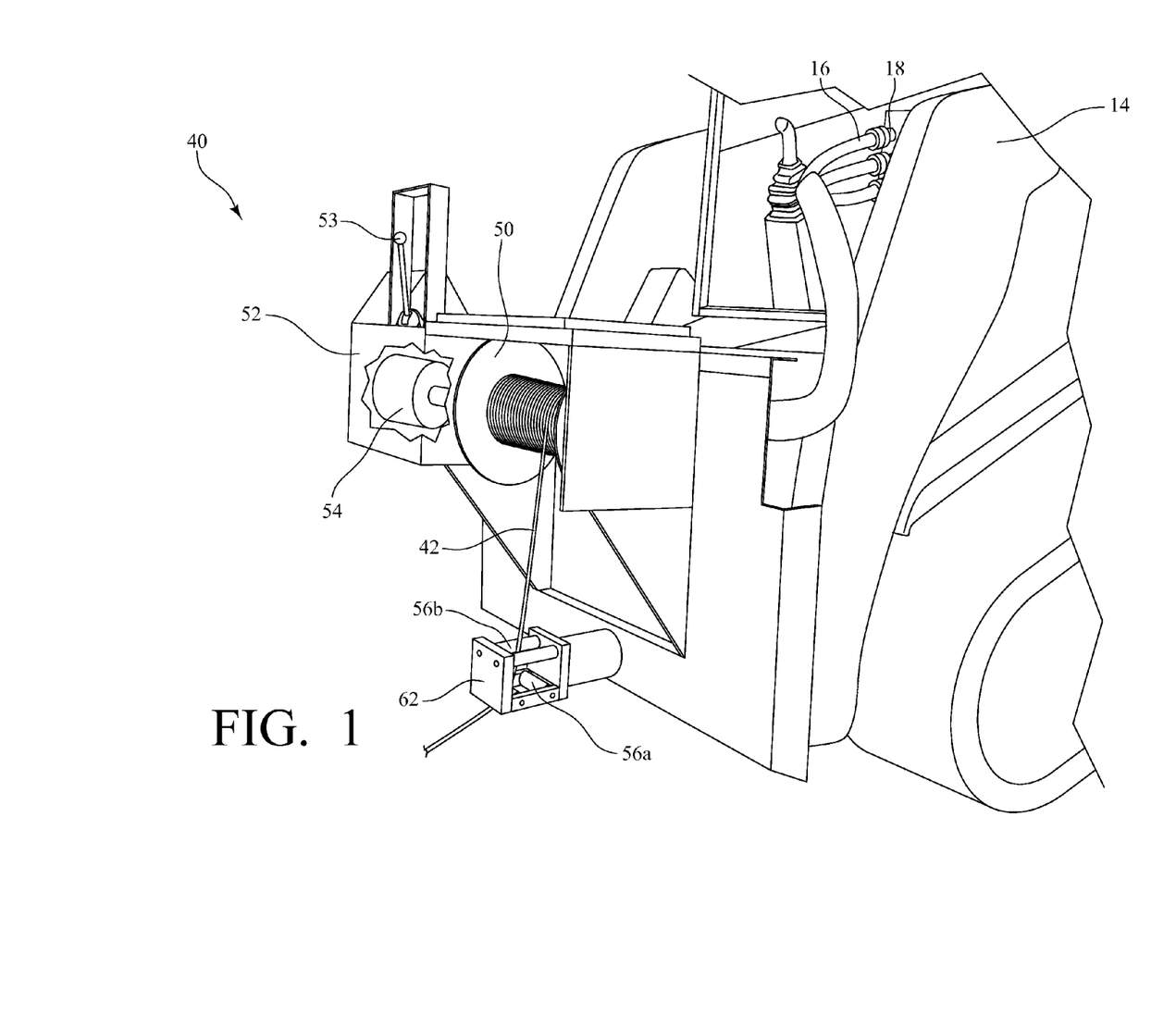
FIG. 1 is a front perspective view of an exemplary apparatus made in accordance with the present invention as it is secured to a typical skid steer loader with tracks.

Returning now to FIG. 2 and the front perspective view of FIG. 1 (or FIG. 1A), fluid to the hydraulic motor 54 of the apparatus 40 is supplied from the existing hydraulic system of the skid steer loader. Specifically, this is accomplished through connection of a set of hydraulic hoses 16 of the apparatus 40 to the hydraulic system of the skid steer loader. In this regard, a common skid steer loader is provided with appropriate couplings 18 for facilitating connection to the hydraulic system. The hydraulic fluid is thus supplied under pressure to the hydraulic motor 54 to rotate the drum 50, and then circulated back to the hydraulic reservoir of the skid steer loader.

Referring still to FIG. 1 (or FIG. 1A), to facilitate the pulling of cable, the frame 41 of the apparatus 40 supports the above-mentioned drum 50, which is mounted for rotation with respect to the frame 41. A length of pull line 42 is coiled onto the drum 50. When an underground cable is to be installed, the skid steer loader and attached apparatus 40 is maneuvered near an opening of the conduit opposite from where the reel or spool of cable is to be pulled. The drum 50 can then be rotated by the hydraulic motor 54, which is housed in an enclosure 52 secured to the frame 41 adjacent the drum 50. In this exemplary embodiment, a lever 53 controls the motor (i.e., forward, reverse, or stop), which, in turn, controls the rotation of the drum 50. Rotation of the drum 50 in one direction uncoils the pull line 42 from the drum 50. Then, in this exemplary embodiment, the pull line 42 passes through a roller guide assembly comprised of two pairs of roller guides 56a, 56b mounted for rotation within a bracket 62, with the bracket 62 being secured to the frame 41 of the apparatus 40. The first or lower roller guides 56a are oriented in a substantially parallel relationship with each other and with the axis of the drum 50. The second or upper roller guides 56b are oriented in a substantially parallel relationship with each other, but at an approximately 90° angle relative to the lower roller guides 56a. Accordingly, the pairs of roller guides 56a, 56b define a central path for the pull line 42 through the roller guide assembly.

Figure 1A:
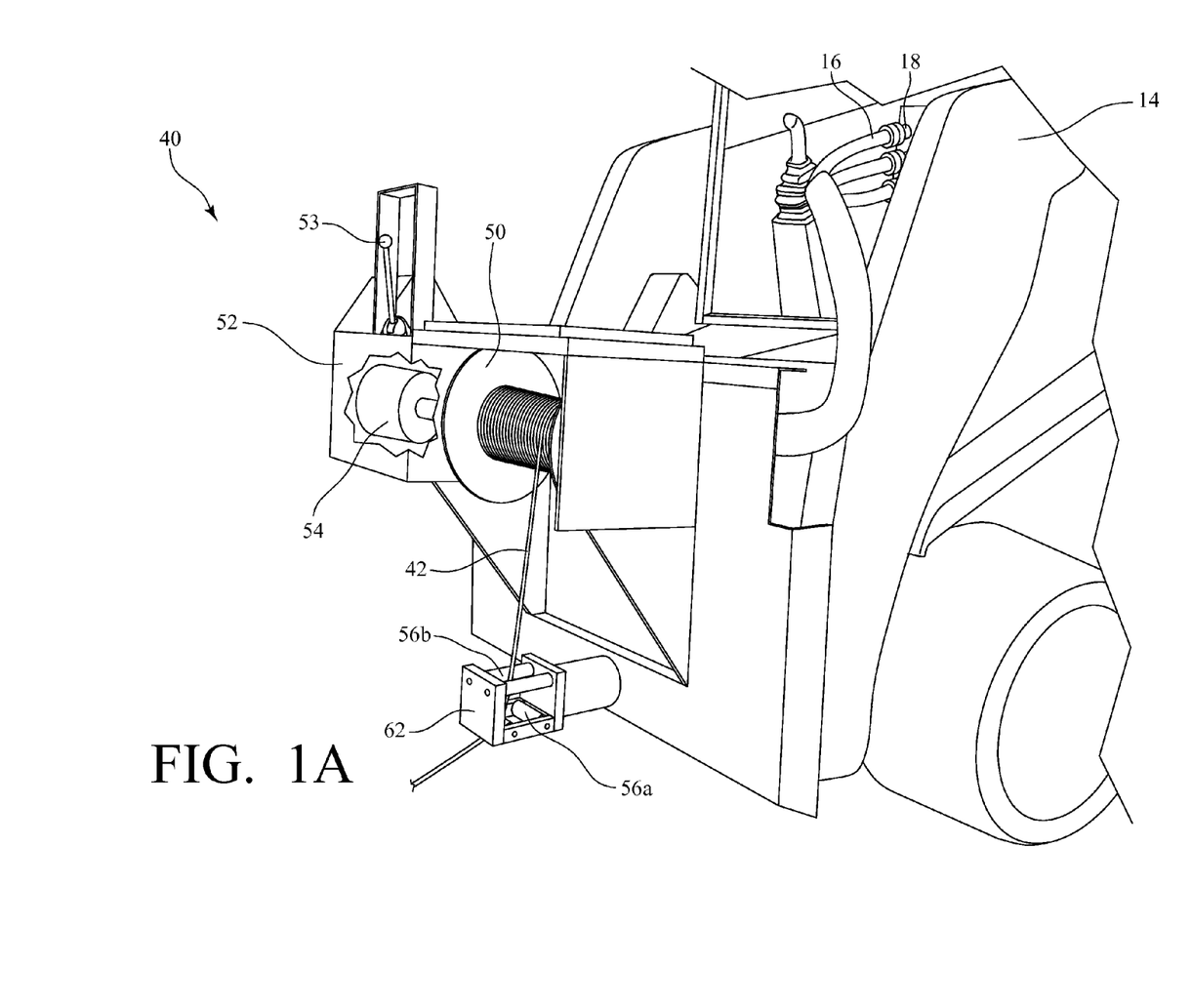
FIG. 1A is a front perspective view of an exemplary apparatus made in accordance with the present invention as it is secured to a typical skid steer loader with wheels.
Figure 2:
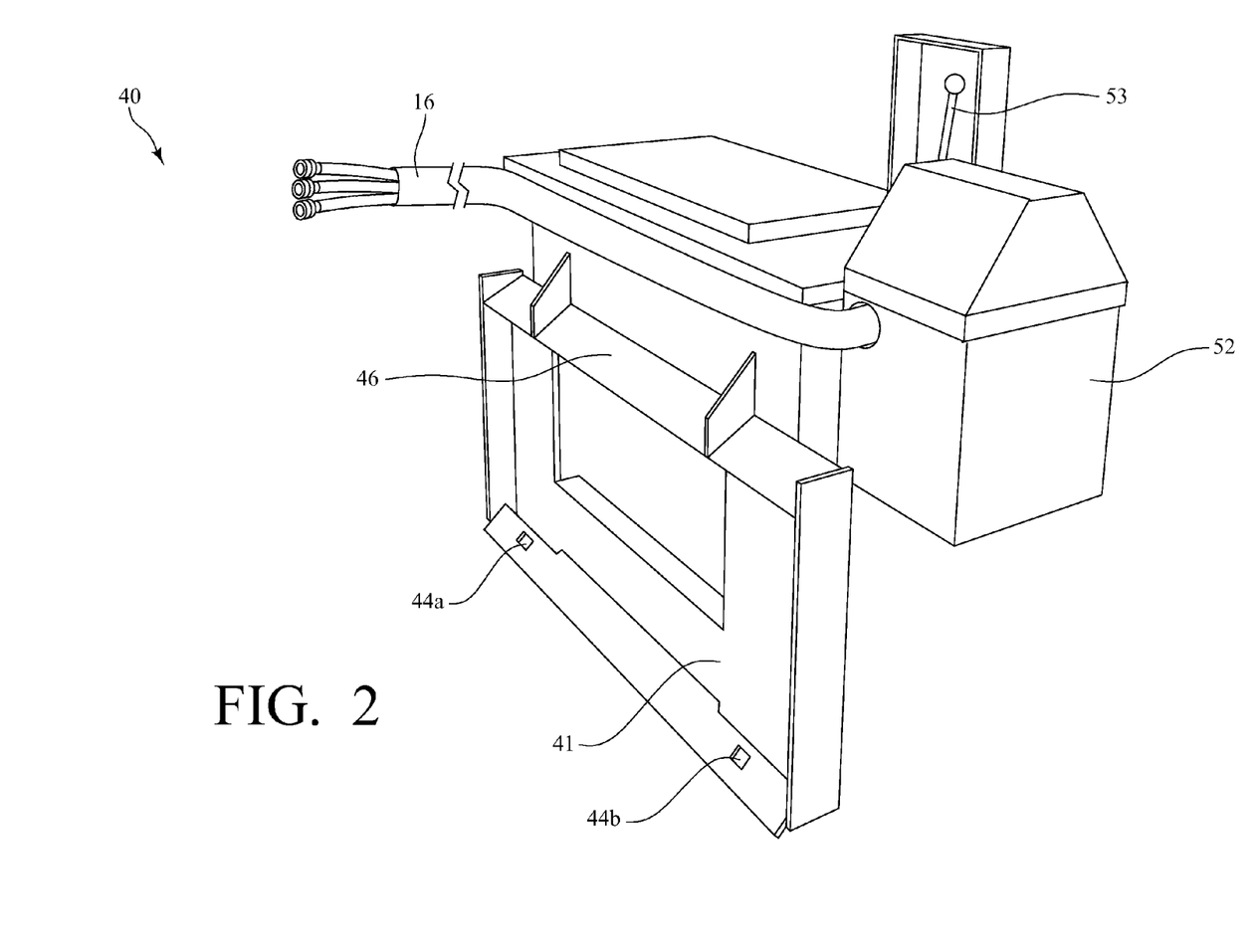
FIG. 2 is a rear perspective view of the exemplary apparatus of FIG. 1 (or FIG. 1A)

As the pull line 42 is uncoiled from the drum 50, it passes through the roller guides 56a, 56b, and is threaded through the conduit. Threading the pull line 42 through the conduit can be accomplished by connecting a string (that was already threaded into and positioned in the conduit prior its installation) to the pull line 42, and then pulling the string to thread the pull line 42 through the conduit. Once the pull line 42 is completely threaded through the conduit, the string is disconnected from the pull line 42. The pull line 42 is then connected to the reel or spool of cable. Once the pull line 42 is connected to the reel or spool of cable, the drum 50 is rotated in a reverse direction by manipulating the lever 53 to reverse the motor 54. The pull line 42 is then coiled onto the drum 50, and the cable is pulled through the conduit.

Once the pull line 42 has been drawn completely through the conduit, the cable may be further pulled through the conduit by wrapping a portion of the pull line 42 around the bracket 62 to fix the position of the pull line 42 relative to the frame 41, and then either raising the skid steer loader boom 14 or backing up the skid steer loader. Once the cable is sufficiently pulled past the opening of the conduit, the pull line 42 is disconnected from the cable, and the apparatus 40 is then ready to pull more cable.

Figure 5:
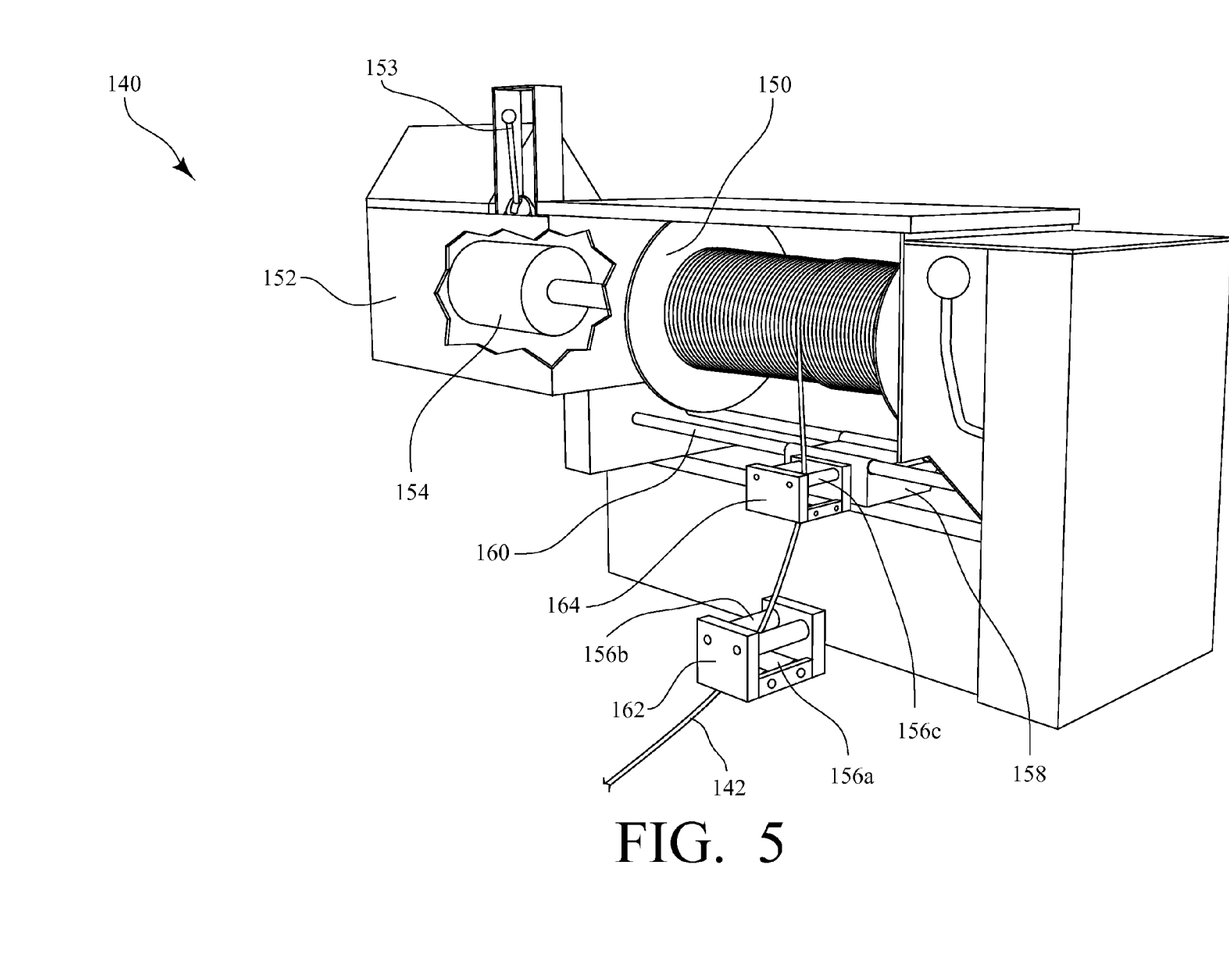
FIG. 5 is a front perspective view of an alternate exemplary apparatus made in accordance with the present invention.

FIG. 5 is a front perspective view of an alternate exemplary apparatus 140 made in accordance with the present invention. The alternate exemplary apparatus 140 shares similar features to the embodiment illustrated in FIGS. 1-2, including: a frame 141; a drum 150 mounted for rotation with respect to the frame 141; a hydraulic motor 154 for rotating the drum 150 which is operated by a lever 153; and first and second pairs of roller guides 156a, 156b. As a further refinement, the alternate exemplary apparatus 140 illustrated in FIG. 5 includes another pair of roller guides 156c mounted for rotation within a bracket 164. These roller guides 156c are located between the roller guides 156a, 156b and the drum 150. These roller guides 156c are oriented in a substantially parallel relationship with each other and with the axis of the drum 150. The bracket 164 in which the roller guides 156c are mounted is secured to a housing 158, which itself is mounted for sliding movement along a track 160 comprised of two parallel rods that extend along the drum 150 and are connected to the frame 141. Accordingly, the housing 158 slides back and forth along the track 160 as the pull line 142 is drawn from or coiled back onto the drum 150, thus allowing the roller guides 156c to work in conjunction with the roller guides 156a, 156b to control the coiling and uncoiling of the pull line 142 along the drum 150.

It should also be noted that an apparatus 40, 140 made in accordance with the present invention could include a locking pin to secure the drum 50, 150 relative to the hydraulic motor 54, 154. Accordingly, if the locking pin were to be disengaged, the drum 50, 150 would freely rotate; in other words, its rotation would no longer be controlled by the hydraulic motor 54, 154, and manual rotation of the drum 50, 150 would be possible.

One of ordinary skill in the art will recognize that additional embodiments are also possible without departing from the teachings of the present invention or the scope of the claims which follow. This detailed description, and particularly the specific details of the exemplary embodiments disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. An apparatus for pulling cable through a conduit that can be readily secured to a construction vehicle, comprising:
    a frame including a means for attaching the apparatus to the construction vehicle;
    a drum mounted for rotation with respect to the frame;
    a hydraulic motor for rotating the drum, said hydraulic motor being supplied with fluid by a hydraulic system of the construction vehicle, wherein rotation of the drum draws a pull line through the conduit and onto the drum, thus causing the cable attached to the pull line to be pulled through the conduit;
    a roller guide assembly secured to said frame, said pull line passing through and being guided by said roller guide assembly as said pull line is drawn from or coiled back onto said drum; and
    another pair of roller guides mounted for rotation within a bracket, with the bracket then secured to a housing which is mounted for sliding movement along a track, such that the housing slides back and forth along the track as the pull line is drawn from or coiled back onto the drum, said track being comprised of two parallel rods that extend along said drum and are connected to said frame.

2. The apparatus for pulling cable as recited in claim 1, and further comprising a set of hydraulic hoses for connecting said hydraulic motor to the hydraulic system of the construction vehicle.

3. The apparatus for pulling cable as recited in claim 1, in which the construction vehicle is a skid steer loader.

4. A combination, comprising:
    a construction vehicle including a pair of tracks for contacting an underlying ground surface, said construction vehicle further including a hydraulic system for operation of the construction vehicle; and said construction vehicle further including a plate with two or spring-loaded locking pins mounted on a front surface of the plate; and
    an apparatus for pulling cable through a conduit, including
        a frame having an upper lip engaging an upper edge of the plate of the construction vehicle and defining one or more holes, each hole receiving one of the spring-loaded locking pins mounted on the front surface of the plate of the construction vehicle, thus attaching the apparatus to the construction vehicle,
        a drum mounted for rotation with respect to the frame, and
        a hydraulic motor for rotating the drum, said hydraulic motor being supplied with fluid by the hydraulic system of the construction vehicle, wherein rotation of the drum draws a pull line through the conduit and onto the drum, thus causing the cable attached to the pull line to be pulled through the conduit.

5. The combination as recited in claim 4, in which the construction vehicle is a skid steer loader.

6. The combination as recited in claim 4, in which the hydraulic motor of said apparatus for pulling cable is housed in an enclosure secured to said frame and adjacent said drum.

7. The combination as recited in claim 4, in which said apparatus for pulling cable further comprises a roller guide assembly secured to said frame, said pull line passing through and being guided by said roller guide assembly as said pull line is drawn from or coiled back onto said drum.

8. The combination as recited in claim 7, in which said roller guide assembly includes two pairs of roller guides mounted for rotation within a bracket, with said bracket being secured to said frame.

9. The combination as recited in claim 8, in which a first pair of roller guides are oriented in a substantially parallel relationship with respect to said drum, and a second pair of roller guides are oriented at an approximately 90° angle relative to the first pair of roller guides, said first and second pairs of roller guides thus defining a central path for the pull line through the roller guide assembly.

10. The combination as recited in claim 7, in which said apparatus for pulling cable further comprises another pair of roller guides mounted for rotation within a bracket, with the bracket then secured to a housing which is mounted for sliding movement along a track, such that the housing slides back and forth along the track as the pull line is drawn from or coiled back onto the drum.

11. The combination as recited in claim 10, in which said track is comprised of two parallel rods that extend along said drum and are connected to said frame.

12. The combination as recited in claim 4, in which said apparatus for pulling cable further comprises a set of hydraulic hoses for connecting said hydraulic motor to the hydraulic system of the construction vehicle.

13. A combination, comprising:
    a construction vehicle including at least two wheels for contacting an underlying ground surface, said construction vehicle further including a hydraulic system for operation of the construction vehicle, and said construction vehicle further including a plate with two or spring-loaded locking pins mounted on a front surface of the plate; and
    an apparatus for pulling cable through a conduit, including
        a frame having an upper lip engaging an upper edge of the plate of the construction vehicle and defining one or more holes, each hole receiving one of the spring-loaded locking pins mounted on the front surface of the plate of the construction vehicle, thus attaching the apparatus to the construction vehicle,
        a drum mounted for rotation with respect to the frame, and
        a hydraulic motor for rotating the drum, said hydraulic motor being supplied with fluid by the hydraulic system of the construction vehicle, wherein rotation of the drum draws a pull line through the conduit and onto the drum, thus causing the cable attached to the pull line to be pulled through the conduit.

14. The combination as recited in claim 13, in which the construction vehicle is a skid steer loader.

15. The combination as recited in claim 13, in which the hydraulic motor of said apparatus for pulling cable is housed in an enclosure secured to said frame and adjacent said drum.

16. The combination as recited in claim 13, in which said apparatus for pulling cable further comprises a roller guide assembly secured to said frame, said pull line passing through and being guided by said roller guide assembly as said pull line is drawn from or coiled back onto said drum.

17. The combination as recited in claim 16, in which said roller guide assembly includes two pairs of roller guides mounted for rotation within a bracket, with said bracket being secured to said frame.

18. The combination as recited in claim 17, in which a first pair of roller guides are oriented in a substantially parallel relationship with respect to said drum, and a second pair of roller guides are oriented at an approximately 90° angle relative to the first pair of roller guides, said first and second pairs of roller guides thus defining a central path for the pull line through the roller guide assembly.

19. The combination as recited in claim 16, in which said apparatus for pulling cable further comprises another pair of roller guides mounted for rotation within a bracket, with the bracket then secured to a housing which is mounted for sliding movement along a track, such that the housing slides back and forth along the track as the pull line is drawn from or coiled back onto the drum.

20. The combination as recited in claim 17, in which said track is comprised of two parallel rods that extend along said drum and are connected to said frame.

21. The combination as recited in claim 13, in which said apparatus for pulling cable further comprises a set of hydraulic hoses for connecting said hydraulic motor to the hydraulic system of the construction vehicle.

* * * * *